(12) United States Patent
Ou

(10) Patent No.: US 11,269,663 B2
(45) Date of Patent: Mar. 8, 2022

(54) METHOD AND APPARATUS FOR ADAPTING HANDLE DEVICE TO THIRD-PARTY APPLICATION, AND STORAGE MEDIUM

(71) Applicant: Tencent Technology (Shenzhen) Company Limited, Shenzhen (CN)

(72) Inventor: Lingmei Ou, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/994,087

(22) Filed: Aug. 14, 2020

(65) Prior Publication Data

US 2020/0371821 A1    Nov. 26, 2020

Related U.S. Application Data

(63) Continuation of application No. PCT/CN2019/083446, filed on Apr. 19, 2019.

(30) Foreign Application Priority Data

May 29, 2018  (CN) .......................... 201810533334.3

(51) Int. Cl.
  *G06F 9/451* (2018.01)
  *G06F 9/54* (2006.01)
(52) U.S. Cl.
  CPC .............. *G06F 9/451* (2018.02); *G06F 9/541* (2013.01); *G06F 9/542* (2013.01); *G06F 9/547* (2013.01)
(58) Field of Classification Search
  None
  See application file for complete search history.

(56) References Cited

U.S. PATENT DOCUMENTS

| | | | |
|---|---|---|---|
| 6,727,884 B1* | 4/2004 | Leatham | |
| 8,214,539 B1* | 7/2012 | Kulanko | |
| 2005/0225530 A1* | 10/2005 | Evans | |
| 2010/0199229 A1* | 8/2010 | Kipman | |

FOREIGN PATENT DOCUMENTS

| | | |
|---|---|---|
| CN | 106178499 A | 12/2016 |
| CN | 107209732 A | 9/2017 |
| CN | 107832105 A | 3/2018 |
| WO | WO 2013/036920 A1 | 3/2013 |

OTHER PUBLICATIONS

International Search Report and Written Opinion for International Application No. PCT/CN2019/083446 dated Apr. 19, 2019; 12 pages.

* cited by examiner

*Primary Examiner* — Syed A Roni
(74) *Attorney, Agent, or Firm* — Crowell & Moring LLP

(57) ABSTRACT

This application provides a method, an apparatus, and a storage medium for adapting a handle device to a third-party application. The method is performed by a terminal in a shield environment, and includes: identifying the third-party application currently run by the terminal and an activity page currently displayed by the third-party application, capturing a handle event generated by the handle device connected to the terminal, analyzing the handle event to obtain an analyzing result, and converting the analyzing result to a first touch event used for controlling the activity page, and transmitting the first touch event to the third-party application for execution, so that the third-party application controls the activity page.

19 Claims, 7 Drawing Sheets

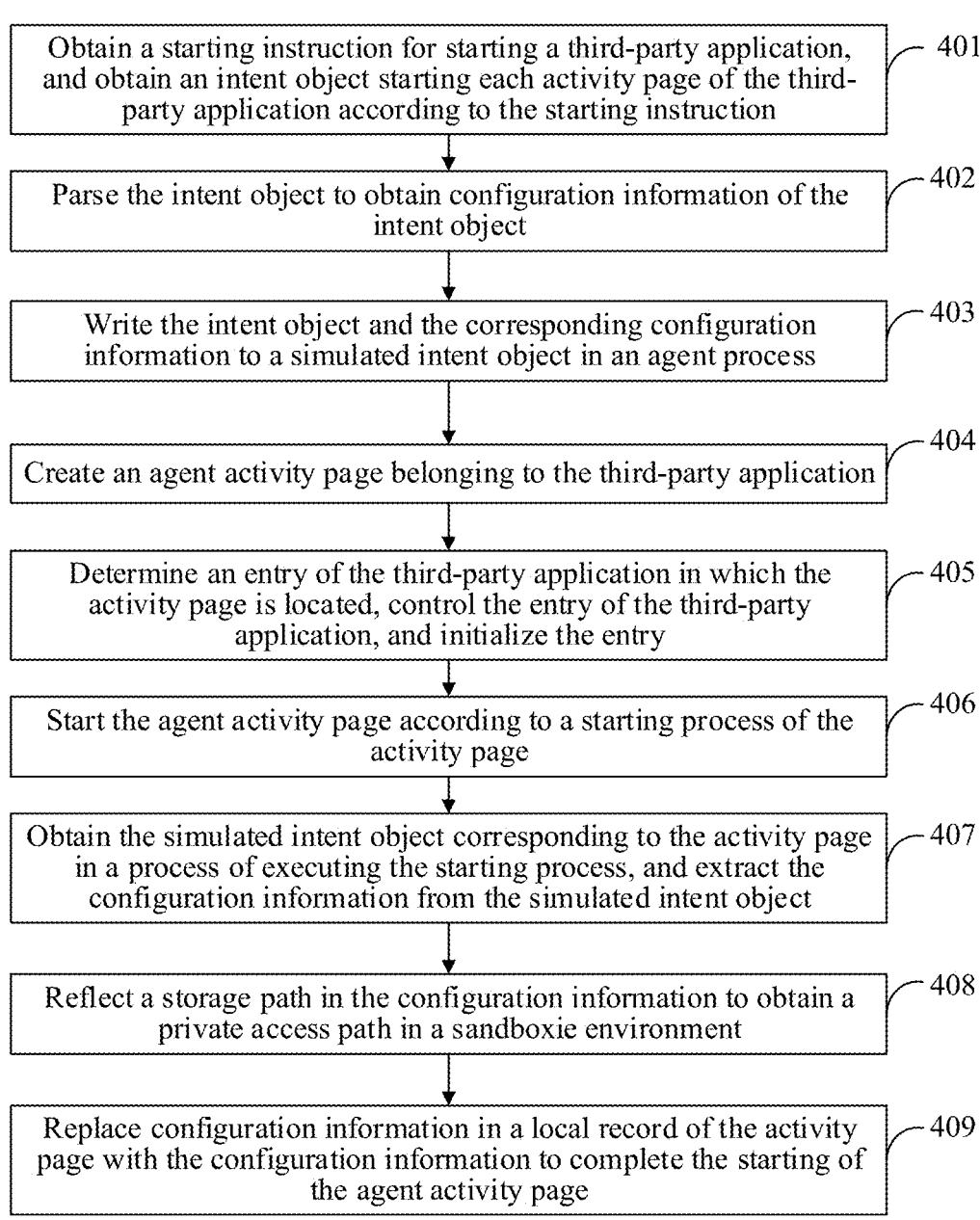

METHOD AND APPARATUS FOR ADAPTING HANDLE DEVICE TO THIRD-PARTY APPLICATION, AND STORAGE MEDIUM

RELATED APPLICATION

This application is a continuation application of the International PCT Application No. PCT/CN2019/083446, filed with the China National Intellectual Property Administration, PRC on Apr. 19, 2019 which claims priority to Chinese Patent Application No. 201810533334.3, entitled "METHOD AND APPARATUS FOR ADAPTING HANDLE TO THIRD-PARTY APPLICATION, AND STORAGE MEDIUM" and filed with the China National Intellectual Property Administration, PRC on May 29, 2018, which are incorporated herein by reference in their entireties.

FIELD OF THE TECHNOLOGY

This disclosure relates to the field of terminal technologies, and in particular, to a method, an apparatus, and a storage medium for adapting a handle device to a third-party application.

BACKGROUND OF THE DISCLOSURE

A handle device is an input device of an electronic game machine. In the electronic game, a simulated character, a virtual object, or the like may be controlled by manipulating components such as buttons of the handle device. With the development of the terminal technologies, at present, a handle may be connected to a smart TV, a smartphone, or the like, and handle device components may be activated through a handle assistant to control a simulated character in a game running on a terminal by using a game handle.

SUMMARY

An embodiment of this disclosure provides a method for adapting a handle to a third-party application, performed by a terminal in a sandbox environment, the method including:
identifying the third-party application currently run by the terminal and an activity page currently displayed by the third-party application;
capturing a handle event generated by a handle device connected to the terminal;
analyzing the handle event to obtain an analyzing result, and generating, according to the analyzing result, a first touch event used for controlling the activity page; and
transmitting the first touch event to the third-party application for execution, so that the third-party application controls the activity page.

An embodiment of this disclosure provides an apparatus for adapting a handle to a third-party application, installed on a terminal and run in a sandbox environment, the apparatus including:
an identification module, configured to identify the third-party application currently run by the terminal and an activity page currently displayed by the third-party application;
a capturing module, configured to capture a handle event generated by a handle device connected to the terminal;
a first generating module, configured to analyze the handle event to obtain an analyzing result, and generate, according to the analyzing result, a first touch event used for controlling the activity page; and a transmission module, configured to transmit the first touch event to the third-party application for execution, so that the third-party application controls the activity page.

An embodiment of this disclosure provides an electronic device, including a memory and a processor in communication with the memory,
by reading executable program code stored in the memory, the processor running a program corresponding to the executable program code to implement the method for adapting a handle to a third-party application according to the embodiments of this disclosure.

An embodiment of this disclosure provides a storage medium, storing a processor executable instruction, the instruction, when executed by one or more processors, implementing the method for adapting a handle to a third-party application according to the embodiments of this disclosure.

BRIEF DESCRIPTION OF THE DRAWINGS

The foregoing and/or additional aspects and advantages of this disclosure will become more obvious and easier to understand from the following descriptions of the embodiments with reference to the accompanying drawings.

FIG. 6 is a schematic flowchart of another method for adapting a handle to a third-party application according to an embodiment of this disclosure.

FIG. 7 is a schematic flowchart of another method for adapting a handle to a third-party application according to an embodiment of this disclosure.

DESCRIPTION OF EMBODIMENTS

The following describes embodiments of this disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain this disclosure and cannot be construed as a limitation to this disclosure.

A method and an apparatus for adapting a handle device to a third-party application, and a storage medium in the embodiments of this disclosure are described below with reference to the accompanying drawings. In this disclosure, a handle device may also be referred to as a handle for short.

In practical use, an application such as a handle assistant may be installed on a terminal. However, in the related art, such an application needs to have a root permission to run. Only when having a root permission, the handle assistant may precisely identify if a currently displayed interface is a game interface for a game application. In addition, by obtaining the root permission, the handle assistant gains the highest permission. As such, the handle assistant can perform operations that may be irrelevant to the game application such as adding, deleting, modifying, and checking on any file in a system (including a system file). The handle assistant that needs to obtain a root permission not only has a relatively high threshold for use, but also causes security risks to the system.

An embodiment of this disclosure provides a method for adapting a handle to a third-party application.

The method for adapting a handle to a third-party application in this embodiment of this disclosure is performed in a sandbox environment or any other shield or isolating environment which provides a mechanism for separating running programs and improving system security. For example, a sandbox in a platform running Java program. In this method, a handle event that is generated by a handle device connected to the terminal is captured in the sandbox environment, the handle event is analyzed, a first touch event used for controlling the activity page is generated according to the analyzing result, and the first touch event is transmitted to the third-party application for execution, so that the third-party application controls the activity page based on the first touch event. The activity page is the displayed page or interface associated with the third-party application, for example, a game page or a game interface. Because the sandbox environment is a virtual system environment, a currently displayed activity page may be identified in the sandbox environment without the need for root permission. This not only lowers the threshold for use, but also eliminates security risks to the system.

Figure 1:
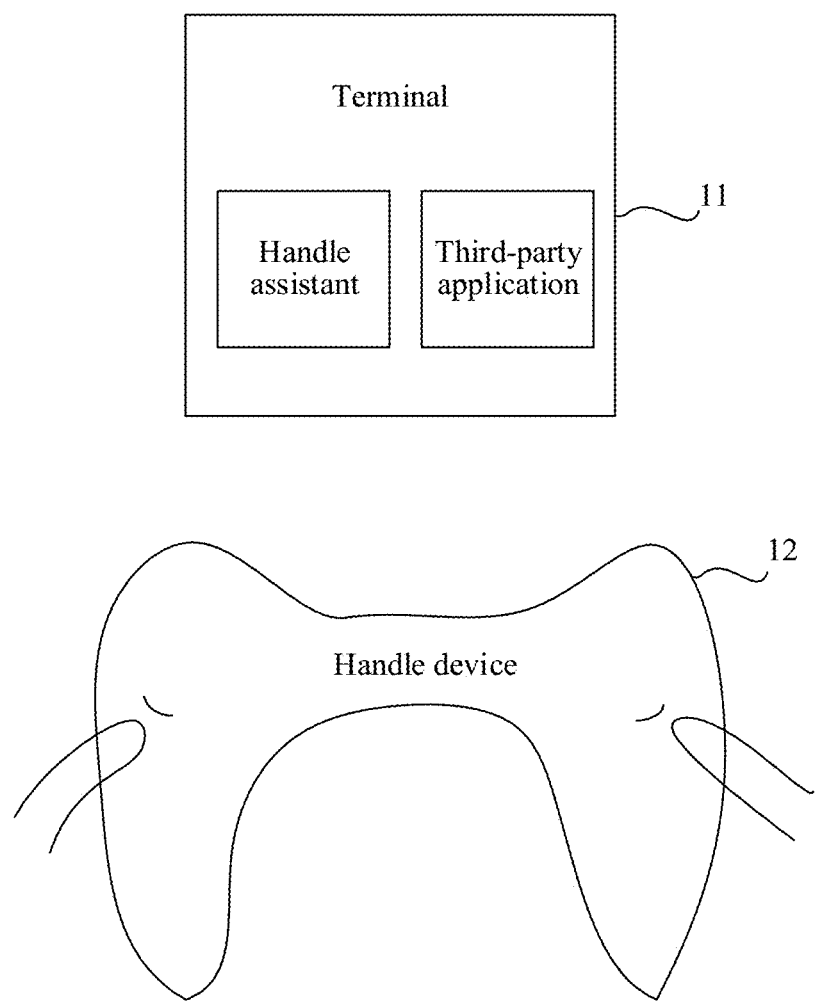
FIG. 1 is a schematic diagram of an exemplary application scenario according to an embodiment of this disclosure.

FIG. 1 is a schematic diagram of an application scenario according to an embodiment of this disclosure. In FIG. 1, a terminal 11 is connected to a handle device 12, the terminal 11 and the handle device 12 may be connected to each other in a wired or a wireless manner, and a handle assistant and a third-party application are installed on the terminal 11.

A user can control an object in an activity page displayed by the third-party application, such as a game character by manipulating buttons on the handle device. The handle assistant is run in the sandbox environment, and may capture a handle event generated by the handle device, analyze the handle event, generate, according to an analyzing result, a first touch event controlling the activity page, and transmit the first touch event to a third-party application. The third-party application controls the activity page according to the first touch event, to control the object in the third-party activity page by using the handle device.

Figure 2:
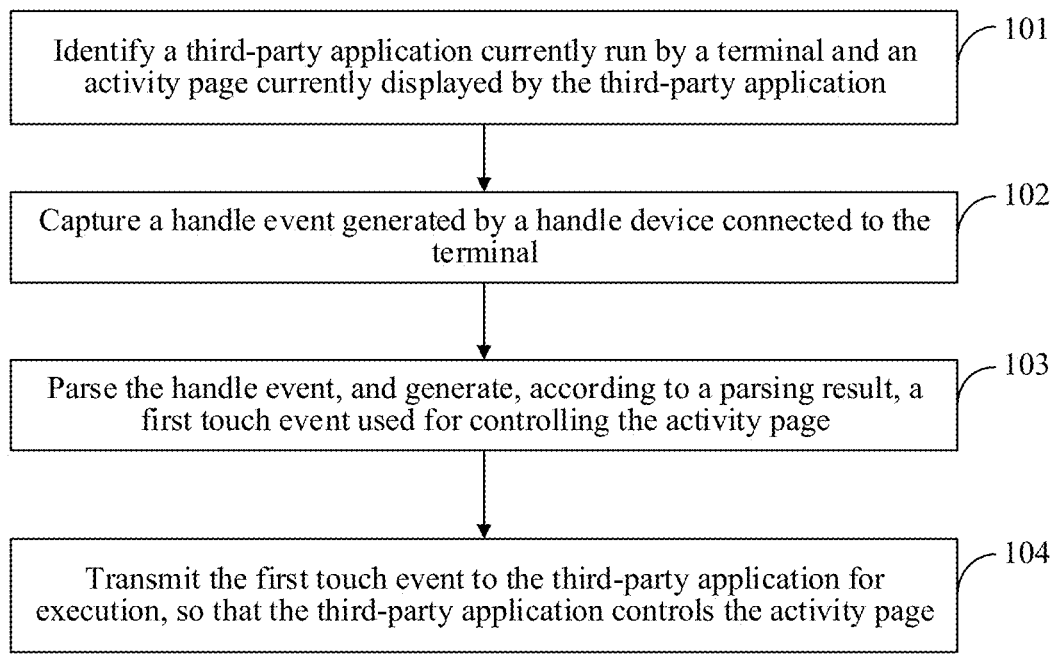
FIG. 2 is a schematic flowchart of a method for adapting a handle to a third-party application according to an embodiment of this disclosure.

FIG. 2 is a schematic flowchart of a method for adapting a handle to a third-party application according to an embodiment of this disclosure. The method is performed by the terminal 11 shown in FIG. 1, for example, the method may be implemented by running an application, such as a handle assistant by the terminal 11 in the sandbox environment.

As shown in FIG. 2, the method for adapting a handle to a third-party application includes the following steps:

Step 101: Identify a third-party application currently run by a terminal and an activity page currently displayed by the third-party application.

A sandbox environment is an independent virtual running environment. In this embodiment, the sandbox environment has a system management permission, and therefore, the third-party application, such as a game application, may be run in the sandbox environment having a system management permission.

In this embodiment, a starting instruction to start a sandbox is detected, and then a sandbox environment having a system management permission is started according to the starting instruction. For example, when an operation of starting the third-party application by the user is detected, an instruction to start the sandbox environment may be generated to start the sandbox environment. After the sandbox environment is successfully started, the third-party application currently run by the terminal is identified in the sandbox environment, and a currently displayed activity page is identified in the sandbox environment. Specifically, the currently run third-party application and the activity page currently displayed by the third-party application may be identified according to information such as a process identifier, the quantity of the currently run processes, or the like.

For example, a game application currently run by the terminal is identified in the sandbox environment. The name of the game application, the category of the game application or the like, is identified, and a game picture currently displayed on a terminal screen is identified. Therefore, a current game interface may be identified in the sandbox environment without the handle assistant having a root permission, so that the threshold for use is lowered and the security risks are eliminated.

In this embodiment, before step 101, a process may be assigned to the third-party application in the sandbox environment first, and the third-party application is started through the assigned process. Each process has a unique process identifier and the third-party application may be identified according to the associated process identifier.

To improve the management of the third-party application and save resources, the assigned process and its associated resources are released when the third-party application exits.

Step 102: Capture a handle event generated by a handle device connected to the terminal.

In this embodiment, an operating system bottom layer may monitor a handle signal transmitted by the handle device associated with the third-party application. When a user operates a control component such as a button on the handle device, the operating system bottom layer detects the handle signal, and analyzes the handle signal to generate an original handle event conforming to an operating system standard. The control component comprises a button on the handle device.

In this embodiment, the handle signal may carry identification information, action information, and the like of a controlled component of the handle device. The action information includes information such as the number of clicks on the controlled component, action amplitude, or the like.

The operating system bottom layer forwards the original handle event to an operating system service layer. The operating system service layer encapsulates the original handle event into a handle event conforming to a standard of an operating system application framework layer, and further transmits the handle event to the operating system application framework layer.

The operating system application framework layer is located and configured in the sandbox environment, so that an event transmitted by the operating system service layer to the operating system application framework layer may be monitored in the sandbox environment. When the detected event is a handle event, the handle event is captured. In this embodiment, when the operating system service layer transmits the handle event to the operating system application framework layer, a special identifier may be added to the handle event, to indicate that the event is a handle event, so that when the special identifier is extracted from the event detected in the sandbox environment, the event may be considered as a handle event.

In this embodiment, when the operating system service layer transmits the handle event to the operating system application framework layer, a handle event of the handle device associated with the third-party application may be captured in the sandbox environment, so that the captured handle event may be processed before the handle event is transmitted to the third-party application currently run by the terminal.

Step 103: Analyze (or parse) the handle event to obtain an analyzing result, and generate, according to the analyzing result, a first touch event used for controlling the activity page.

A mobile phone is used as an example. When playing a game on the mobile phone, a user may perform a touch operation on the game interface directly. After the touch operation is detected by a game application, a touch event is generated, and a controlled object in the game is controlled by executing the touch event. Therefore, when the game is played by using a handle device connected to the mobile phone, the handle event needs to be converted into a corresponding touch event, so that the game may be played by using the handle device.

Generally, an activity page is provided with virtual buttons, and the activity page that is run in the game may be controlled by using the virtual buttons. In an example of this disclosure, the virtual buttons may be replaced with buttons on the handle device. The operating system bottom layer can detect a handle event initiated from the handle device and then the handle event may be captured in the sandbox environment. After being captured, the handle event is analyzed, and then identification information and action information of the control component of the handle device are extracted from the analyzing result and are converted into identification information and action information of a corresponding button, to generate a touch event.

Specifically, the identification information and the action information of the controlled component on the handle device are extracted from the analyzing result of the handle event. Then, a preset mapping relationship between identification information of the component and a button identifier on an activity page is queried, according to the identification information of the controlled component, to obtain a button identifier matching the component identification information. Therefore, the controlled component may be mapped to a button on the activity page.

After the matched button identifier is obtained, a target button may be determined according to the matched button identifier. It is to be understood that the matched button identifier is a target button identifier. Further, the first touch event may be generated according to the target button identifier and the action information. Specifically, when the first touch event is generated, coordinate information of an object in the activity page controlled by the handle device may be further extracted and added to the first touch event. Then, the first touch event may include the identification and coordinate information of the target button. The coordinate information is the coordinate information of the object controlled by the handle device, such as a game character displayed on the activity page.

For example, a current activity page has buttons enabling the object to move left and right, and the identification information of the controlled component on the handle device and the number of clicks are extracted from the analyzing result of the handle event. According to the identification information of the controlled component, a button identifier matching the identification information of the controlled component may be acquired through querying the preset mapping relationship described above, assuming the button identifier is an identifier of a button enabling the object to move right. Then, the first touch event may be generated according to the identifier of the button and the number of clicks.

In this embodiment, in the sandbox environment, the captured handle event is processed, and the first touch event is generated according to the analyzing result of the handle event, so that the currently run third-party application performs a corresponding operation.

Step 104: Transmit the first touch event to the third-party application for execution, so that the third-party application controls the activity page.

In this embodiment, after the first touch event is generated, the first touch event is transmitted to the third-party application for execution. Because the first touch event includes the identification and coordinate information of the target button, the third-party application may perform the corresponding operation according to the first touch event to control the activity page displayed by the third-party application.

Specifically, a controlled object at corresponding coordinate information in the activity page may be controlled to perform actions corresponding to the action information of the target button. The controlled object may be a character, an object, or the like in the activity display page (i.e., the game interface).

In this embodiment, the handle event is captured and converted into the first touch event controlling the activity page, and the first touch event is transmitted to the third-party application for execution to control the currently displayed activity page. Because the sandbox environment is a virtual system environment, a currently displayed activity page may be identified in the sandbox environment without the need for the handle assistant having a root permission to identify the current activity page. This not only lowers the threshold for use, but also eliminates security risks to the system.

In addition, in the related art, a user may need to download a repackaged game installation package. The repackaged game installation package may contain some malware or viruses that harm the user and the game device. In the method for adapting a handle to a third-party application provided in this embodiment of this disclosure, the user does not need to download a repackaged game, so that the security of the terminal is improved.

Figure 3:
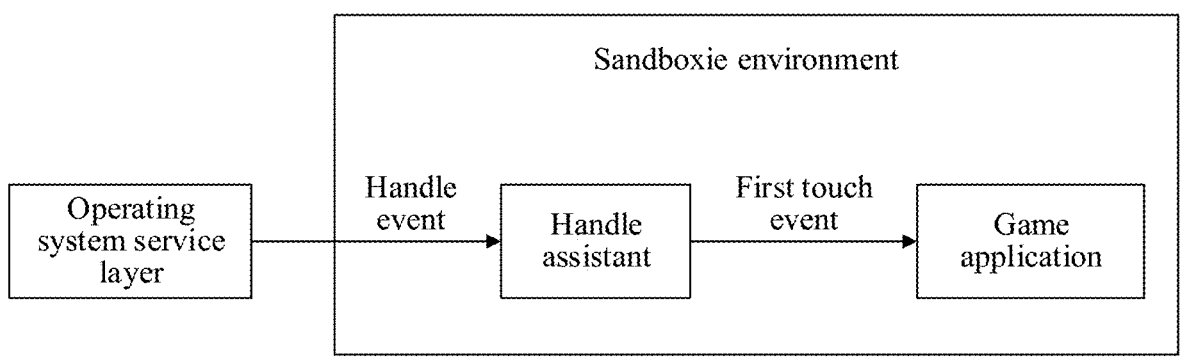
FIG. 3 is a schematic diagram of a process of a method for adapting a handle to a third-party application according to an embodiment of this disclosure.

FIG. 3 is a schematic diagram of a process of a method for adapting a handle to a third-party application according to an embodiment of this disclosure. In FIG. 3, a handle assistant and a game application are both run in a sandbox environment. The method shown in FIG. 3 is performed by the terminal 11 shown in FIG. 1. For example, the method may be implemented by running an application, such as a handle assistant by the terminal 11.

Before a game is played by using the handle device, a handle assistant is installed in the terminal first, and then the game is started from the handle assistant. During playing the game by a user using the handle device, as shown in FIG. 3, an operating system service layer transmits a handle event destined for the game application. The handle event is captured by the handle assistant in the sandbox environment first. The handle assistant processes the handle event, for example, analyzes the handle event and generates a first touch event according to an analyzing result of the handle event. Then, the handle assistant transmits the first touch event to the game application for execution, to control a game interface.

In this embodiment, the first touch event that is generated according to the analyzing result of the handle event is transmitted to a third-party application run by the terminal for execution, so that a currently displayed activity page is controlled by using the handle device.

Figure 4:
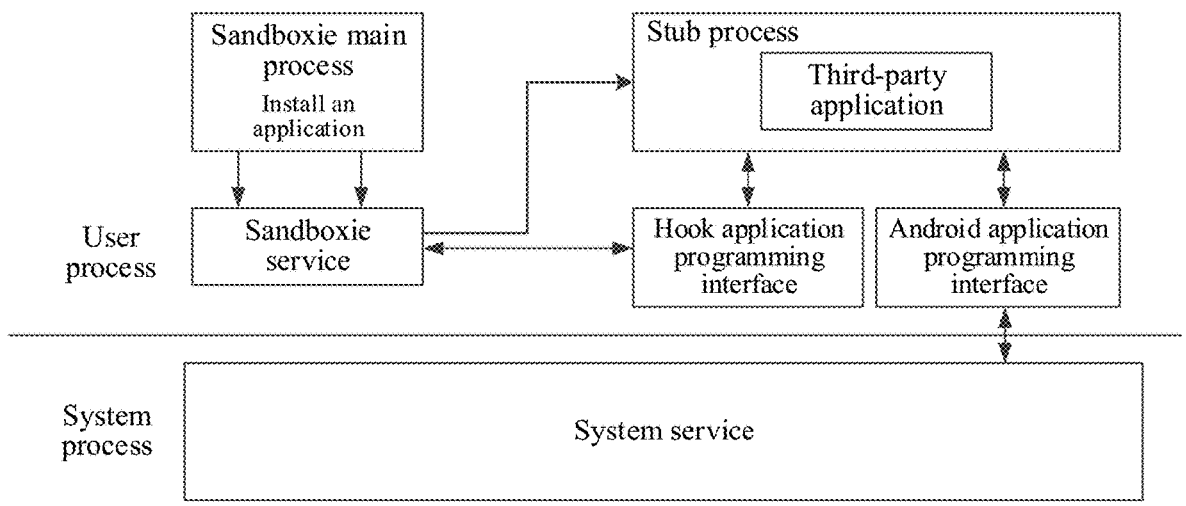
FIG. 4 is a schematic diagram of interaction between processes of a method for adapting a handle to a third-party application according to an embodiment of this disclosure.

FIG. 4 is a schematic diagram of the interaction between processes of a method for adapting a handle to a third-party application according to an embodiment of this disclosure. As shown in FIG. 4, processes can be divided into two types: a user process and a system process. An application (App for short) is installed in a sandbox main process, which is a user process. The App may be a game application. A sandbox service has a system management permission, which can identify an activity page of a third-party application currently running.

A third-party App installed in the sandbox environment may be started through a stub process, and a handle event may be captured through the stub process.

After the handle event is captured, the stub process may obtain an object in the sandbox environment by reflecting an object in an operating system through a hook application programming interface (Hook API). In addition, the stub process may call an API in a system service of a system process through an Android API to enable various services and functions that are provided by the operating system framework. The sandbox environment is transparent to the user and these services and functions running in the sandbox environment are the same as if they were running in the operating system framework directly.

For example, an ActivityManagerService (AMS), a PackageManagerService (PMS), a WindowManagerService (WMS), or the like may be called through the Android application programming interface (Android API). The AMS, the PMS, the WMS and the like are services run in a system service process.

Figure 5:
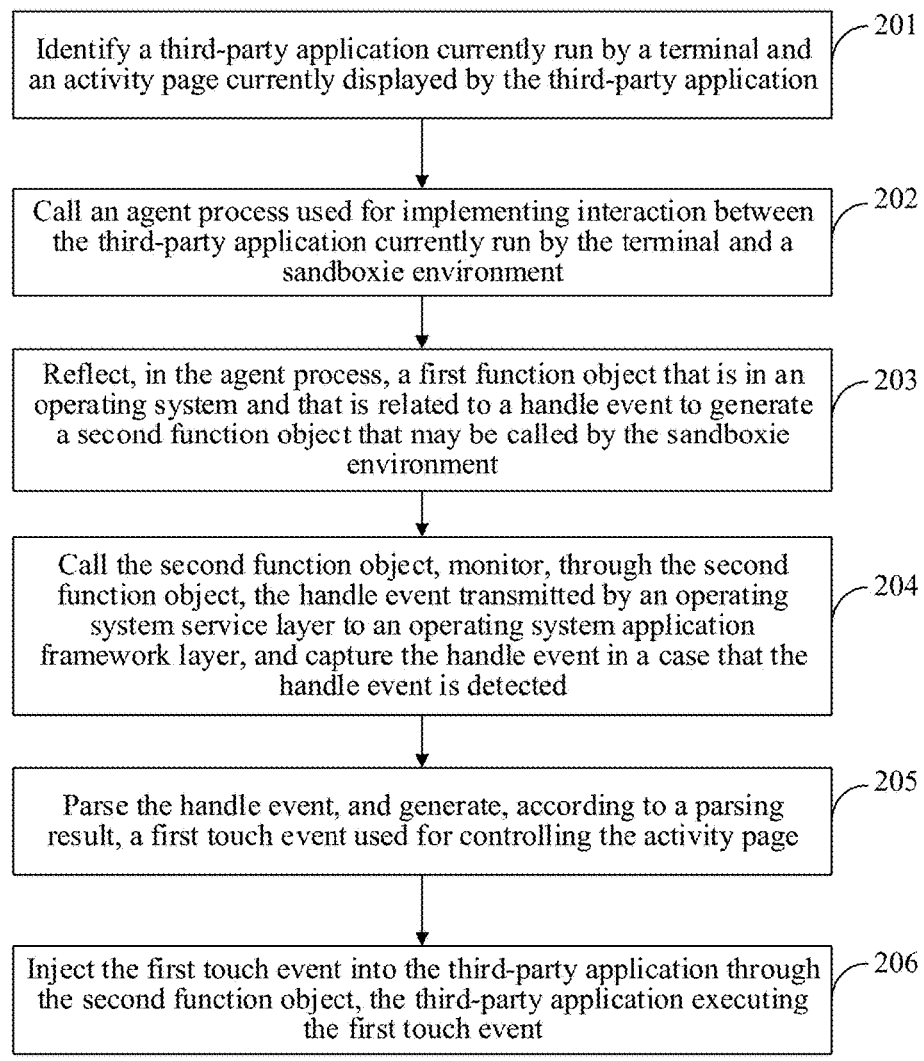
FIG. 5 is a schematic flowchart of another method for adapting a handle to a third-party application according to an embodiment of this disclosure.

To capture a handle event in the sandbox environment, an event transmitted by the operating system service layer to the operating system application framework layer is monitored in the sandbox environment. When the detected event is a handle event, before the handle event is captured, an agent process may be called, and in the agent process, an object that can monitor the handle event is obtained through reflection. FIG. 5 is a schematic flowchart of another method for adapting a handle to a third-party application according to an embodiment of this disclosure.

As shown in FIG. 5, the method for adapting a handle to a third-party application includes the following steps:

Step 201: Identify a third-party application currently run by a terminal and an activity page currently displayed by the third-party application.

In this embodiment, step 201 is similar to step 101 in the foregoing embodiment, and details are not described herein again.

Step 202: Call an agent process used for implementing interaction between the third-party application currently run by the terminal and the sandbox environment.

To implement the interaction between the sandbox environment and the currently run third-party application, an agent process, such as a stub process, is called in the sandbox environment to implement the interaction between the third-party application and the sandbox environment.

Step 203: Reflect, in the agent process, a first function object in an operating system that is related to the handle event to generate a second function object that can be called in the sandbox environment.

In this embodiment, the first function object may be understood as an object created in the operating system according to the object type related to the handle event, and the object is used for monitoring and processing the handle event in the operating system.

Because the object related to the handle event in the operating system is different from that in the sandbox environment, the first function object is reflected to generate the second function object that can be called by the sandbox environment.

Step 204: Call the second function object, monitor, through the second function object, a handle event transmitted by an operating system service layer to an operating system application framework layer, and capture the handle event in a case that the handle event is detected.

For example, a WindowInputEventReceiver object is obtained through reflection. In the sandbox environment, the WindowInputEventReceiver object is called to monitor the handle event. When the WindowInputEventReceiver object detects the handle event, the handle event is captured.

In this embodiment, the second function object is obtained by reflection, and the sandbox environment may capture the handle event by calling the second object.

Step 205: Analyze the handle event to obtain an analyzing result, and generate, according to the analyzing result, a first touch event used for controlling the activity page.

In this embodiment, step 205 is similar to step 103 in the foregoing embodiment, and details are not described herein again.

Step 206: Inject the first touch event into the third-party application through the second function object, the third-party application executing the first touch event.

In this embodiment, when the first touch event is transmitted to the third-party application currently run by the terminal, the first touch event may be injected into the third-party application through the second function object. That is, there is no need for the third-party application to create a new object, as the third-party application obtains the first touch event directly from the second function object for execution, and implements control over the currently displayed activity page.

In the method for adapting a handle to a third-party application in this embodiment of this disclosure, an agent process used for implementing interaction between the third-party application and the sandbox environment is called in the sandbox environment. In the agent process, the second function object is obtained by reflection, and the handle event is captured in the sandbox environment, processed, and transmitted to the third-party application for execution.

Furthermore, after the agent process is called, an activity page of the third-party application may be further created in the agent process. FIG. 6 is a schematic flowchart of another method for adapting a handle to a third-party application according to an embodiment of this disclosure. The method for adapting a handle to a third-party application in this embodiment of this disclosure, after step 202, may further include the following steps shown in FIG. 6:

Step 301: Create an entry to the third-party application in the agent process, and initialize the entry to the third-party application, the entry is served as an interface to the third-party application.

To control the third-party application, after the agent process is called, the entry to the third-party application needs to be created and initialized in the agent process. Then in the agent process, the third-party application may be accessed and controlled through the entry.

Step 302: Create an agent activity page belonging to the third-party application.

After the entry to the third-party application is initialized, in the agent process, the third-party application may be accessed through the entry to the third-party application, and the agent activity page of the third-party application may be created. That is, through the agent process, the agent activity page of the third-party application is created, so that the third-party application is managed in the sandbox environment.

In this embodiment, an activity page created in the agent process for the third-party application is referred to as an agent activity page. By creating the agent activity page in the agent process, the activity page of the third-party application may be more precisely identified for capturing the handle event.

Furthermore, in this embodiment of this disclosure, the third-party application and the agent activity page may be started in the sandbox environment. For example, a game may be started in a handle assistant, and played by using a handle device. FIG. 7 is a schematic flowchart of another method for adapting a handle to a third-party application according to an embodiment of this disclosure.

As shown in FIG. 7, the method for adapting a handle to a third-party application includes the following steps:

Step 401: Obtain a starting instruction for starting the third-party application, and obtain an intent object starting each activity page of the third-party application according to the starting instruction.

In one embodiment, the third-party application is an application associated with the handle device running in a sandbox environment, such as a game application.

That the method for adapting a handle to a third-party application according to this embodiment of this disclosure is implemented by the terminal 11 by running a handle assistant is used as an example. When a user opens the third-party application in the handle assistant, the handle assistant obtains the starting instruction for starting the third-party application in the sandbox environment. Then, the intent object that starts each activity page of the third-party application is started according to the starting instruction. The intent object is an object created according to an intent type of each activity page.

Step 402: Analyze the intent object to obtain configuration information of the intent object.

In this embodiment, after the intent object is started, for each intent object, the intent object is analyzed to obtain the configuration information of the intent object.

Step 403: Write the intent object and the corresponding configuration information to a simulated intent object in an agent process.

In this embodiment, the simulated intent object is created in the agent process. After the intent object and the corresponding configuration information are obtained, the intent object and the corresponding configuration information are written into the simulated intent object in the agent process, so that an agent activity page is created according to the simulated intent object in the agent process.

Step 404: Create an agent activity page belonging to the third-party application.

In this embodiment, the agent activity page belonging to the third-party application may be created according to the simulated intent object in the agent process. Specifically, the agent activity page of the third-party application may be created according to the intent object and the corresponding configuration information, so that the agent activity page is created according to the simulated intent object in the agent process.

Step 405: Determine an entry to the third-party application in which the activity page is located, control the entry to the third-party application, and initialize the entry.

After the agent activity page belonging to the third-party application is created, the entry to the third-party application in which the activity page is located is searched for and determined, then the entry to the third-party application is controlled and initialized, to facilitate accessing the third-party application.

Step 406: Start the agent activity page according to a starting process of the activity page.

In this embodiment, after the entry is initialized, the agent activity page is started according to the starting process of the activity page, and the task of starting the third-party application is implemented in the sandbox environment.

Step 407: Obtain the simulated intent object corresponding to the activity page when executing the starting process, and extract configuration information from the simulated intent object.

When executing the starting process of the activity page, the simulated intent object corresponding to the activity page is obtained, and the configuration information is extracted from the simulated intent object. For example, information such as a value of a parameter in the activity page is extracted.

Step 408: Reflect a storage path in the configuration information to obtain a private access path in the sandbox environment.

In this embodiment, a storage path in the configuration information is modified to be a private access path in the sandbox environment. After the storage path is modified, when a game is run in the sandbox environment, the game may read/write data using the private access path.

Step 409: Replace configuration information in a local record of the activity page with the configuration information extracted from the simulated intent object to complete the starting of the agent activity page.

After the storage path of the configuration information is reflected to obtain the private access path in the sandbox environment, the configuration information in the local record of the activity page is replaced with the configuration information extracted from the simulated intent object to start the agent activity page based on the replaced configuration information.

In the method for adapting a handle to a third-party application in this embodiment of this disclosure, the third-party application is loaded and managed in the sandbox environment by replacing the activity page of the third-party application with the agent activity page.

Based on the foregoing embodiment, when playing a game by using a handle device, a user may simultaneously perform a touch operation on a terminal screen. To improve the control accuracy of the game page, while capturing the handle event, the sandbox environment also monitors in real time a second touch event generated when the terminal screen is touched. When the second touch event is detected, the second touch event is captured.

The second touch event includes identification and coordinate information of a target button. The target button is a button on the terminal screen touched by the user, and the coordinate information is coordinate information of an object controlled through the touch operation on the activity page.

To improve the accuracy of controlling the activity page, in the method for adapting a handle to a third-party application in this embodiment of this disclosure, when a second touch event is detected, a multi-touch event is generated according to the first touch event and the second touch event, and the multi-touch event is transmitted to the application for execution.

Specifically, the multi-touch event is generated according to identification information and action information of a target button in the first touch event and identification information and action information of a target button in the second touch event. The multi-touch event includes the identification and coordinate information of the target button in the first touch event and the identification and coordinate information of the target button in the second touch event. The coordinate information in the multi-touch event includes the coordinate information of both the object controlled by the handle device and the object controlled by the touch operation.

After the multi-touch event is generated, the multi-touch event is transmitted to the third-party application for execution. Specifically, the multi-touch event may be injected into the third-party application, and the third-party application executes the multi-touch event. The third-party application may control the controlled object at a corresponding position on the activity page to perform corresponding actions according to the identification and coordinate information of the target button in the multi-touch event, to control the currently displayed activity page.

In this embodiment, the second touch event generated when a terminal screen is touched may be monitored in the sandbox environment. When the second touch event is detected, the handle event and the second touch event may be simultaneously captured, and a multi-touch event is generated according to the first touch event and the second touch event, so that when a user plays a game by simultaneously using the handle device and touching the terminal screen, the game application can precisely control the activity page.

Figure 8:
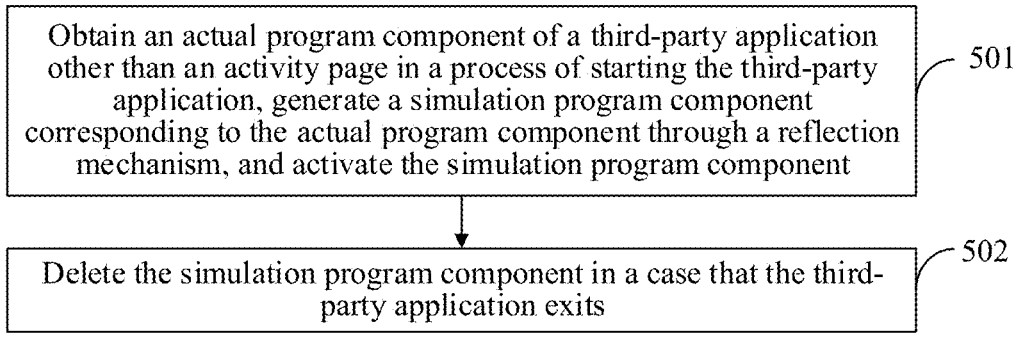
FIG. 8 is a schematic flowchart of another method for adapting a handle to a third-party application according to an embodiment of this disclosure.

Furthermore, to improve the management of the third-party application, a simulation program component may be generated and activated before the third-party application currently run by the terminal and the activity page currently displayed by the third-party application are identified in the sandbox environment. The simulation program component may also be deleted when needed. FIG. 8 is a schematic flowchart of another method for adapting a handle to a third-party application according to an embodiment of this disclosure.

The method for adapting a handle to a third-party application in this embodiment of this disclosure, before the third-party application currently run by the terminal and the activity page currently displayed by the third-party application are identified in the sandbox environment, further includes the following steps, as shown in FIG. 8:

Step 501: Obtain an actual program component of the third-party application other than the activity page when starting the third-party application, generate a simulation program component corresponding to the actual program component through a reflection mechanism, and activate the simulation program component.

In this embodiment, the simulation program component is configured to replace the actual program component in the third-party application. The actual program component is considered to be the original software component comes with the third-party application.

For example, by reflecting a service program component, a broadcast receiver program component, or a content provider component, a corresponding simulated service program component, a simulated broadcast receiver program component, or a simulated content provider component may be generated, to replace the corresponding actual program component in the third-party application.

In this embodiment, the simulation program component other than the activity page is generated and activated through the reflection mechanism to replace the actual program component in the third-party application, thereby reducing interaction with the third-party application and saving interaction time.

Step 502: Delete the simulation program component when the third-party application exits.

To save resources, when the third-party application exits, for example, when the game exits, the simulation program component is deleted, thereby saving storage space.

In this embodiment, when the third-party application is started, a simulation program component is generated and activated, to replace an actual program component of the third-party application, and the simulation program component is deleted when the third-party application exits, thereby saving not only time of interaction with the third-party application, but also storage space.

The third-party application in the sandbox environment cannot obtain the directory assigned by the operating system. As a virtual system environment, the sandbox environment may need to assign various independent file directories to a loaded third-party application, and ensure that the third-party application in the sandbox environment can find correct paths when accessing files in the directories. Therefore, when a third-party application is started for the first time in the sandbox environment, an access path needs to be created for the third-party application.

Figure 9:
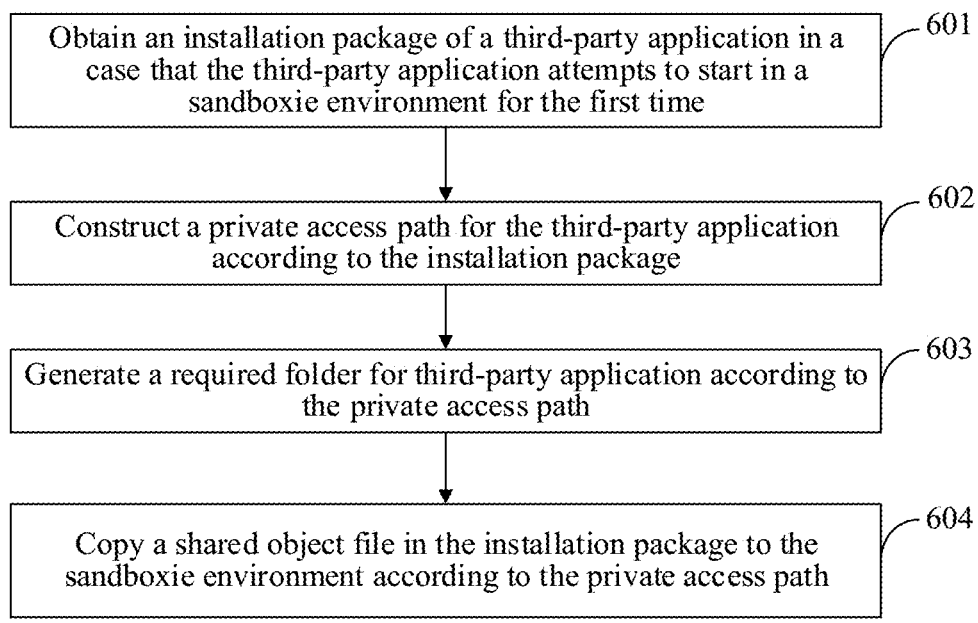
FIG. 9 is a schematic flowchart of another method for adapting a handle to a third-party application according to an embodiment of this disclosure.

FIG. 9 is a schematic flowchart of another method for adapting a handle to a third-party application according to an embodiment of this disclosure. As shown in FIG. 9, the method for adapting a handle to a third-party application includes the following steps:

Step 601: Obtain an installation package of the third-party application when the third-party application attempts to start in the sandbox environment for the first time.

In this embodiment, when the third-party application attempts to start in the sandbox environment for the first time, it is determined whether there is a local installation package of the third-party application, and if there is an installation package of the third-party application, the installation package of the third-party application is obtained. Otherwise, an installation package of the third-party application may be downloaded.

Step 602: Construct a private access path for the third-party application in the sandbox environment according to the installation package.

After the installation package is obtained, installation package information, such as an installation location, installation time, or the like, is parsed and recorded, and a private access path is constructed for the third-party application in the sandbox environment according to the installation package information. For example, an application data directory or the like is created according to the installation information of the third-party application.

In this embodiment, the private access path is constructed in the sandbox environment to improve the security. For example, in one embodiment, the private access path may only be accessed by its corresponding third-party application, and the third-party application may only access its assigned private access path.

Step 603: Generate a required folder for third-party application according to the private access path.

After the private access path is constructed, in the private access path, a required folder, such as a "src" folder for storing source code or a "res" folder for storing resources is generated for the third-party application.

Step 604: Copy a shared object file in the installation package to the sandbox environment according to the private access path.

The shared object file is, for example, a shared dynamic link library file, or a shared object, or the like.

In this embodiment, the shared file in the installation package may be copied to a corresponding location in the private access path constructed in the sandbox environment.

In the method for adapting a handle to a third-party application in this embodiment of this disclosure, when the third-party application is started in the sandbox environment for the first time, an independent private access path is assigned to the third-party application, the file that is required by the third-party application is generated, and the required shared object file is copied to the sandbox environment, to ensure that the third-party application in the sandbox can access the file in a directory according to a correct path. Based on such configuration, the third-party application is started in the sandbox environment. Therefore, a game that does not support the handle device may be adapted to run in the sandbox environment to gain handle device support. As such, the threshold for use is lowered and the game can be adapted to more users.

Figure 10:
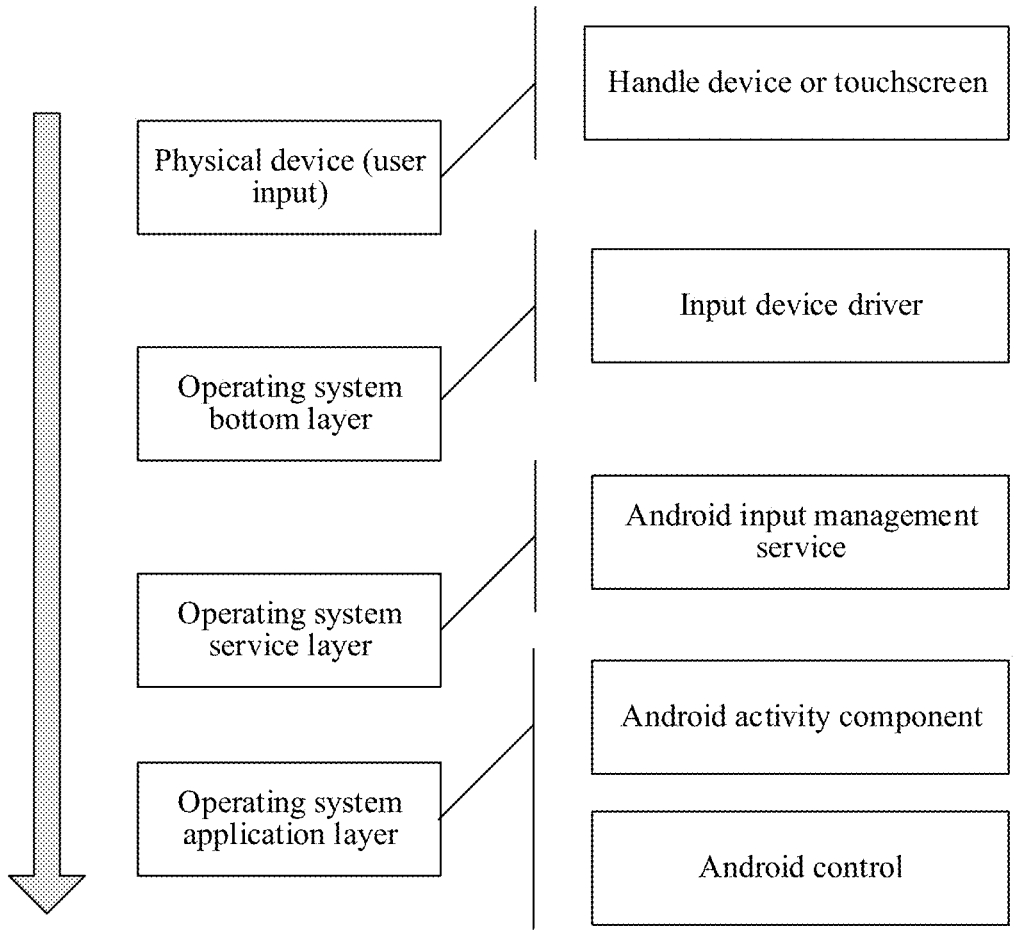
FIG. 10 is a schematic flowchart of a specific method for adapting a handle to a third-party application according to an embodiment of this disclosure.

FIG. 10 is a schematic flowchart of a specific method for adapting a handle to a third-party application according to an embodiment of this disclosure. An Android operating system is used as an example in FIG. 10. There is no limitation on the operating system in this disclosure. As shown in FIG. 10, when a user performs an operation by using a physical device, such as a handle device or a touchscreen of a terminal, an operating system bottom layer, such as a Linux Kernel layer parses and converts an interrupt signal such as a handle event interrupt signal generated by an input operation of a physical device into an original handle event conforming to the android OS standard. Specifically, the interrupt signal is transmitted to an input device driver, and then transmitted to a Linux input stack by the input device driver, which may be stored in the /dev/input/directory.

An operating system service layer monitors and reads a data change in the input directory. When a data change is detected, the original handle event is converted and encapsulated into a standard handle event of an operating system application layer and transmitted to the operating system application layer. In practice, for example, this may be implemented through an Android InputManagerService, involving a type, such as an Android InputManager, a NativeInputManager, an EventHub, an InputReader, an InputReaderPolicy, an InputDispatcher, an Input DispatcherPolicy, an InputChannel or the like.

The operating system bottom layer may display a current activity page by using an Android activity component (Android Activity), or an Android control (Android View). When received by the operating system application layer, the handle event has entered the sandbox environment. In the sandbox environment, a WindowInputEventReceiver object that is related to the handle event may be obtained through reflection. In a specific implementation, this may be implemented through types such as com.android.server.input.InputManagerService, android.view.InputChannel, com.android.server.wm. WindowManagerService, InputChannel, Application View, or the like.

After the WindowInputEventReceiver object is obtained, the first touch event may be injected into the third-party application through the object, and the first touch event is executed by the third-party application.

Figure 11:
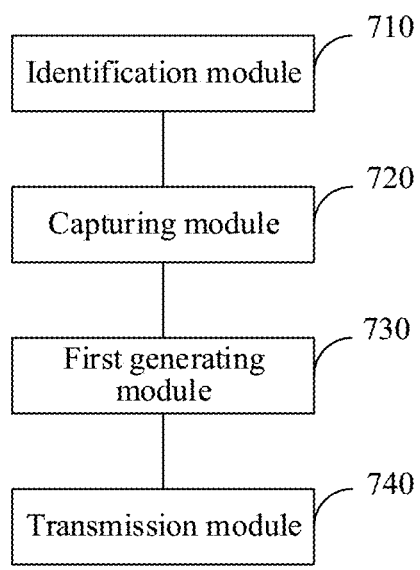
FIG. 11 is a schematic structural diagram of an apparatus for adapting a handle to a third-party application according to an embodiment of this disclosure.

To implement the foregoing embodiment, an embodiment of this disclosure further provides an apparatus for adapting a handle to a third-party application. FIG. 11 is a schematic structural diagram of an apparatus for adapting a handle to a third-party application according to an embodiment of this disclosure.

As shown in FIG. 11, the apparatus for adapting a handle to a third-party application includes: an identification module 710, a capturing module 720, a first generating module 730, and a transmission module 740.

The identification module 710 is configured to identify a third-party application currently run by a terminal and an activity page currently displayed by the third-party application.

The capturing module 720 is configured to capture a handle event generated by a handle device connected to the terminal.

The first generating module 730 is configured to analyze the handle event to obtain an analyzing result, and generate, according to the analyzing result, a first touch event used for controlling the activity page.

The transmission module 740 is configured to transmit the first touch event to the third-party application for execution, so that the third-party application controls the activity page.

Figure 12:
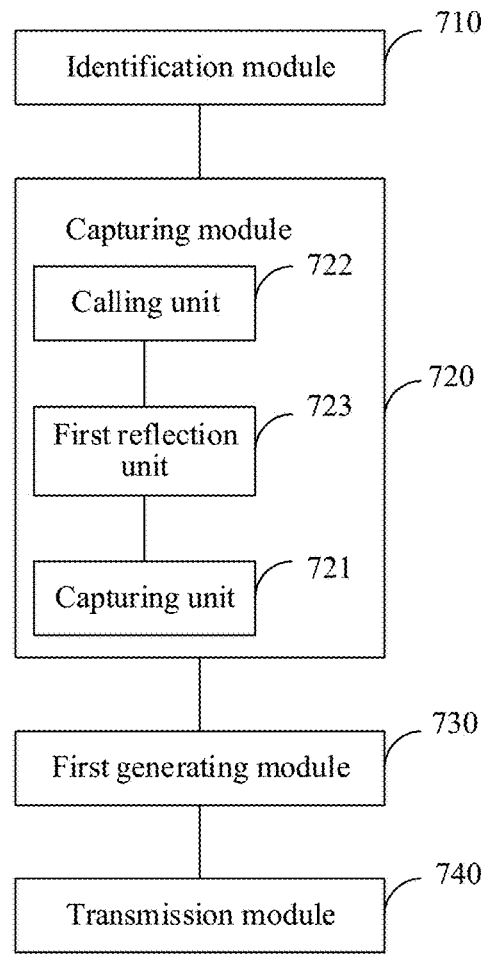
FIG. 12 is a schematic structural diagram of another apparatus for adapting a handle to a third-party application according to an embodiment of this disclosure.

FIG. 12 is a schematic structural diagram of another apparatus for adapting a handle to a third-party application according to an embodiment of this disclosure. In a possible implementation of this embodiment, as shown in FIG. 12, the capturing module 720 includes:

a capturing unit 721, configured to monitor an event transmitted by an operating system service layer to an operating system application framework layer, and capture the event, if the detected event is the handle event, wherein the handle event is detected by an operating system bottom layer and forwarded to the operating system service layer.

In a possible implementation of this embodiment, as shown in FIG. 12, the capturing module 720 further includes:

a calling unit 722, configured to call an agent process used for implementing interaction between the third-party application and the sandbox environment before capturing an event transmitted by the operating system service layer to the operating system application framework layer if the event is a handle event;

a first reflection unit 723, configured to reflect, in the agent process, a first function object in an operating system and related to the handle event, to generate a second function object that can be called by the sandbox environment; and the capturing unit, further configured to call the second function object, monitor, through the second function object, the handle event transmitted by the operating system service layer to the operating system application framework layer, and capture the handle event if the handle event is detected.

In a possible implementation of this embodiment, the transmission module 740 is further configured to:

inject the first touch event into the third-party application through the second function object, the third-party application executing the first touch event.

In a possible implementation of this embodiment, the capturing module 720 further includes:

a first creation unit, configured to create, after calling the agent process that is used for implementing the interaction between the third-party application and the sandbox environment, an entry to the third-party application in the agent process, and initialize the entry to the third-party application; and a second creation unit, configured to create, after initializing the entry to the third-party application is completed, an agent activity page belonging to the third-party application.

In a possible implementation of this embodiment, the capturing module 720 further includes:

a first obtaining unit, configured to obtain, before creating the agent activity page belonging to the third-party application, a starting instruction for starting the third-party application, and obtain an intent object used for starting each activity page of the third-party application according to the starting instruction;

a second obtaining unit, configured to analyze the intent object to obtain configuration information of the intent object; and a writing unit, configured to write the intent object and the corresponding configuration information to a simulated intent object in the agent process.

In a possible implementation of this embodiment, the capturing module 720 further includes:

a determining unit, configured to determine, after creating the agent activity page belonging to the third-party application, the entry to the third-party application to which the activity page belongs, control the entry to the third-party application, and initialize the entry;

a starting unit, configured to start, after initializing the entry is completed, the agent activity page according to a starting process of the activity page;

an extracting unit, configured to obtain the simulated intent object corresponding to the activity page when executing the starting process, and extract the configuration information from the simulated intent object;

a second reflect unit, configured to reflect a storage path in the configuration information to obtain a private access path in the sandbox environment; and the starting unit, further configured to replace configuration information in a local record of the activity page with the extracted configuration information to complete the starting of the agent activity page.

In a possible implementation of this embodiment, the capturing module 720 is further configured to monitor, a second touch event generated in a case that a terminal screen is touched; and the transmission module 740 is further configured to generate a multi-touch event according to the first touch event and the second touch event if the second touch event is detected, and transmit the multi-touch event to the third-party application for execution.

In a possible implementation of this embodiment, the first generating module 730 is further configured to:

analyze the handle event, and extract, from the analyzing result, component identification information and action information of a controlled component on the handle device;

query a mapping relationship between the component identification information and a button identifier on the activity interface to obtain a button identifier matching the component identification information, and determine a target button according to the mapped button identifier, the mapped button identifier being a target button identifier; and generate the first touch event according to the target button identifier and the action information.

In a possible implementation of this embodiment, the apparatus further includes:

a second generating module, configured to obtain, before identifying the third-party application currently run by the terminal and the activity page currently displayed by the third-party application, an actual program components of the third-party application other than the activity page when starting the third-party application, generate a simulation program component corresponding to the actual program component through a reflection mechanism, and activate the simulation program component, the simulation program component being configured to replace the actual program component in the third-party application; and a deleting module, configured to delete the simulation program component and its allocated resources when the third-party application exits.

In a possible implementation of this embodiment, the apparatus further includes:

an obtaining module, configured to obtain an installation package of the third-party application when the third-party application attempts to start in the sandbox environment for the first time;

a construction module, configured to construct a private access path for the third-party application according to the installation package;

a third generating module, configured to generate a required folder for the third-party application according to the private access path; and a copy module, configured to copy a shared object file in the installation package to the sandbox environment according to the private access path.

In a possible implementation of this embodiment, the apparatus further includes:

an assigning module, configured to assign, before identifying the third-party application currently run by the terminal and the activity page currently displayed by the third-party application, a process to the third-party application, and start the third-party application through the assigned process; and a recycling module, configured to recycle the assigned process and releases its allocated resource such as storage, or memory, or the like when the third-party application exits.

The foregoing explanations and descriptions of the embodiments of the method for adapting a handle to a third-party application are also applicable to the apparatus for adapting a handle to a third-party application in this embodiment, and details are not described herein again.

The apparatus for adapting a handle to a third-party application in this embodiment of this disclosure is run in a sandbox environment. The apparatus identifies a third-party application currently run by a terminal and an activity page currently displayed by a third-party application, captures, in the sandbox environment, a handle event generated by a handle device connected to the terminal, parses the handle event, generates, according to an analyzing result, a first touch event used for controlling the activity page, and transmits the first touch event to the third-party application for execution, so that the currently displayed activity page is controlled. In this embodiment, the handle event is captured in the sandbox environment and parsed, then the first touch event controlling the activity page is generated according to the analyzing result and transmitted to the third-party application for execution, so that the currently displayed activity page is controlled. Because the sandbox environment is a virtual system environment, a currently displayed activity page may be identified in the sandbox environment without the handle assistant having a root permission to identify the current activity page. This not only lowers the threshold for use, but also eliminates security risks to the system.

Figure 13:
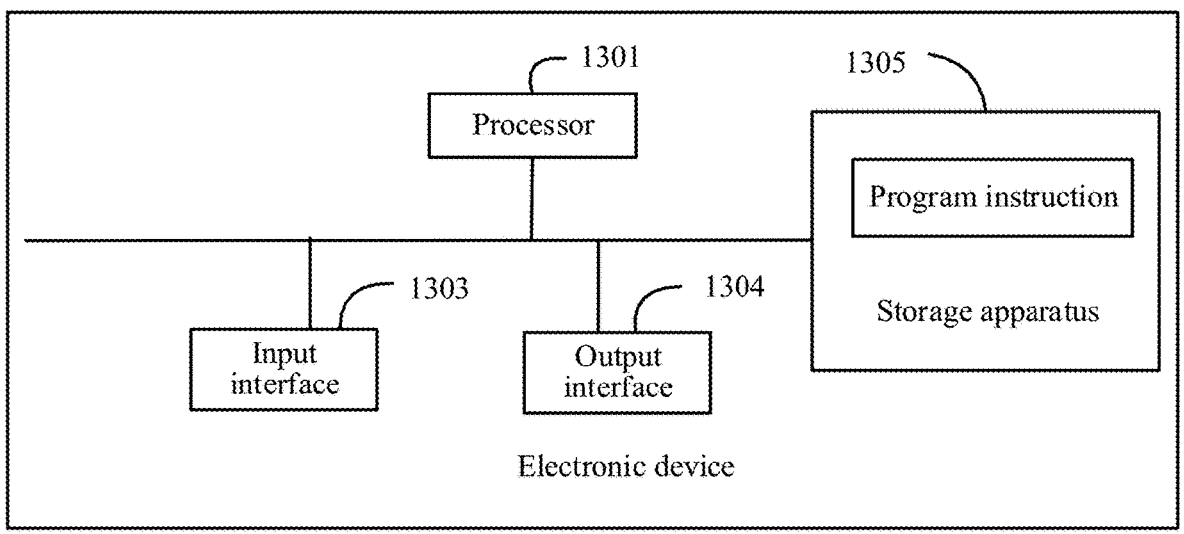
FIG. 13 is a schematic structural diagram of an electronic device according to an embodiment of this disclosure.

To implement the foregoing embodiments, an embodiment of this disclosure further provides an electronic device, and the electronic device may be a terminal. FIG. 13 is a schematic structural diagram of an electronic device according to an embodiment of this disclosure. As shown in FIG. 13, the electronic device includes a power supply source, a housing, and the like, and the electronic device may further include: at least one processor 1301, an input interface 1303, an output interface 1304, and a storage apparatus 1305.

In an embodiment, the input interface 1303 may be a network interface or a user interface. The output interface 1304 may be a network interface, or a display interface of a display or the like, and can display an activity page of a third-party application.

The storage apparatus 1305 may include a volatile memory, for example, a random-access memory (RAM). The storage apparatus 1305 may alternatively include a non-volatile memory, for example, a flash memory, or a solid-state drive (SSD). The storage apparatus 1305 may alternatively include a combination of the foregoing types of memories.

The processor 1301 may be a central processing unit (CPU). In an embodiment, the processor 1301 may further include a hardware chip. The hardware chip may be an application-specific integrated circuit (ASIC), a programmable logic device (PLD), or the like. The PLD may be a field-programmable gate array (FPGA), a generic array logic (GAL), or the like.

In an embodiment, the storage apparatus 1305 is further configured to store a program instruction. The processor 1301 may call the program instruction to implement the methods and the steps described in the embodiments of this disclosure.

For implementation of a specific function of the processor 1301 according to this embodiment of this disclosure, refer to the description of related content in the foregoing embodiments. Details are not described herein.

To implement the foregoing embodiments, an embodiment of this disclosure further provides a non-temporary computer-readable storage medium, storing a computer program, the program, when executed by the processor, implementing the method for adapting a handle to a third-party application in the foregoing embodiments.

In the descriptions of this specification, the terms such as "first" and "second" are used only for the purpose of description, and cannot be understood as indicating or implying the relative importance or implicitly specifying the number of the indicated technical features. Therefore, a feature defined by "first" or "second" can explicitly or implicitly include at least one of said features. In the descriptions of this disclosure, "a plurality of" means at least two, such as two and three unless it is specifically defined otherwise.

Any process or method description described in a flowchart or described herein in another manner may be understood as a module, segment, or part representing code including one or more executable instructions for implementing specific logical functions or steps of a process. In addition, a range of preferred implementations of this disclosure include another implementation, and functions can be executed not according to the shown or discussed sequence, including according to a basically simultaneous manner according to involved functions or an opposite sequence, which is to be understood by a person skilled in the art of the embodiments of this disclosure.

Logic and/or steps described in the flowcharts or described herein in other manners, for example, may be understood as a sequencing list of executable instructions for implementing logic functions and may be specifically implemented in any computer-readable medium, to be used by an instruction execution system, apparatus or device (such as a system based on a computer, a system including a processor, or another system capable of obtaining an instruction from the instruction execution system, apparatus or device and executing the instruction), or to be used in combination with the instruction execution system, apparatus or device. In terms of this specification, the "computer-readable medium" may be any apparatus that may include, store, communicate with, transfer, or transmit programs to be used by the instruction execution system, apparatus, or device or used by combining the instruction execution system, apparatus, or device. The computer-readable medium includes more specific examples (a non-exhaustive list): an electric connection part (electronic device) having one or more wirings, a portable computer disk cartridge (magnetic apparatus), a random access memory (RAM), a read-only memory (ROM), an erasable programmable ROM (EPROM or flash memory), an optical fiber apparatus, or a portable CD ROM. In addition, the computer-readable medium may even be paper on which the program can be printed, or another appropriate medium, as the program can be obtained in an electronic manner, for example, by performing optical scanning on the paper or the another medium, and then performing editing and analyzing, or performing processing in other appropriate manners when necessary, and then the program can be stored in a computer memory.

A person of ordinary skill in the art may understand that implementation of all or some of the steps in the methods in the foregoing embodiments may be implemented by a program instructing related hardware. The program may be stored in a computer readable storage medium, and when the program is executed, one of or a combination of the steps in the method embodiments are performed.

In addition, functional units in the embodiments of this disclosure may be integrated into one processing module, or each of the units may exist alone physically, or two or more units are integrated into one module. The integrated modules may be implemented in a form of hardware, or may be implemented in a form of a software functional module. When the integrated module is implemented in a form of a software functional module and sold or used as an independent product, the integrated module may alternatively be stored in a computer-readable storage medium.

The foregoing storage medium may be a read-only memory, a magnetic disk, or an optical disc, or the like. Although the embodiments of this disclosure are already shown and described above, it may be understood that the foregoing embodiments are exemplary, and are not to be understood as limitations to this disclosure. A person of ordinary skill in the art may change, modify, replace, and transform the foregoing embodiments within the scope of this disclosure.

What is claimed is:

1. A method for adapting a handle device to a third-party application, performed by a terminal in a shield environment, the method comprising the following operations:
assigning a process to the third-party application, and starting the third-party application through the assigned process;
identifying the third-party application currently run by the terminal and an activity page currently displayed by the third-party application;
capturing a handle event generated by the handle device connected to the terminal;
analyzing the handle event to obtain an analyzing result, and converting the analyzing result to a first touch event used for controlling the activity page;
transmitting the first touch event to the third-party application for execution, so that the third-party application controls the activity page; and
recycling the assigned process and releasing resources allocated for the assigned process when the third-party application exits.

2. The method according to claim 1, wherein capturing the handle event generated by the handle device connected to the terminal comprises:
monitoring an event transmitted by an operating system service layer to an operating system application framework layer, and capturing the event in a case that the monitored event is a handle event, wherein the handle event is detected by an operating system bottom layer and forwarded to the operating system service layer.

3. The method according to claim 2, wherein before monitoring the event transmitted by the operating system service layer to the operating system application framework layer, the method further comprises:
calling an agent process used for implementing interaction between the third-party application and the shield environment; and
reflecting, in the agent process, a first function object in an operating system that is related to the handle event, to generate a second function object that can be called by the shield environment.

4. The method according to claim 3, wherein monitoring the event transmitted by the operating system service layer to the operating system application framework layer and capturing the event comprises:
calling the second function object, monitoring, through the second function object, the handle event transmitted by the operating system service layer to the operating system application framework layer, and capturing the handle event in a case that the handle event is detected.

5. The method according to claim 3, wherein transmitting the first touch event to the third-party application for execution comprises:
injecting the first touch event into the third-party application through the second function object, so that the third-party application executes the first touch event.

6. The method according to claim 3, wherein after calling the agent process used for implementing interaction between the third-party application and the shield environment, the method further comprises:

creating an entry to the third-party application in the agent process, and initializing the entry to the third-party application; and
creating an agent activity page belonging to the third-party application through access provided by the entry to the third-party application.

7. The method according to claim 6, wherein before creating an agent activity page belonging to the third-party application, the method further comprises:
obtaining a starting instruction for starting the third-party application, and obtaining an intent object for starting the activity page of the third-party application according to the starting instruction, wherein the intent object is an object created according to an intent type of the activity page;
analyzing the intent object to obtain configuration information of the intent object; and
writing the intent object and the configuration information to a simulated intent object in the agent process.

8. The method according to claim 7, wherein after creating an agent activity page belonging to the third-party application, the method further comprises:
determining the entry to the third-party application to which the activity page belongs;
controlling and initializing the entry to the third-party application;
starting the agent activity page according to a starting process of the activity page;
obtaining the simulated intent object corresponding to the activity page when executing the starting process, and extracting the configuration information from the simulated intent object;
reflecting a storage path in the configuration information to obtain a private access path in the shield environment; and
replacing configuration information in a local record of the activity page with the configuration information to complete the starting of the agent activity page.

9. The method according to claim 1, further comprising:
monitoring a second touch event triggered by a terminal screen touch operation while capturing the handle event;
generating a multi-touch event according to the first touch event and the second touch event in a case that the second touch event is detected; and
transmitting the multi-touch event to the third-party application for execution.

10. The method according to claim 1, wherein analyzing the handle event to obtain the analyzing result comprises:
analyzing the handle event, and extracting, from the analyzing result, component identification information and action information of a controlled component on the handle device;
querying a mapping relationship between the component identification information and a button identifier on the activity page to obtain a button identifier matching the component identification information, and determining a target button according to the obtained button identifier, wherein the obtained button identifier is a target button identifier; and
generating the first touch event according to the target button identifier and the action information.

11. The method according to claim 1, wherein before identifying the third-party application currently run by the terminal and the activity page currently displayed by the third-party application, the method further comprises:

obtaining an actual program component of the third-party application other than the activity page when starting the third-party application, generating a simulation program component corresponding to the actual program component through a reflection mechanism, and activating the simulation program component, wherein the simulation program component is configured to replace the actual program component in the third-party application; and deleting the simulation program component when the third-party application exits.

12. The method according to claim 1, further comprising:
obtaining an installation package of the third-party application when the third-party application attempts to start in the shield environment for the first time;
constructing a private access path for the third-party application according to the installation package;
generating a required folder for the third-party application according to the private access path; and
copying a shared object file in the installation package to the shield environment according to the private access path.

13. An apparatus for adapting a handle device to a third-party application, comprising a memory storing computer readable instructions and a processor in communication with the memory, wherein the processor is configured to run a shield environment and execute the computer readable instructions to cause the apparatus to:
assign a process to the third-party application, and starting the third-party application through the assigned process;
identify the third-party application currently run by the apparatus and an activity page currently displayed by the third-party application;
capture a handle event generated by the handle device connected to the apparatus;
analyze the handle event to obtain an analyzing result, and converting the analyzing result to a first touch event used for controlling the activity page;
transmit the first touch event to the third-party application for execution, so that the third-party application controls the activity page; and
recycle the assigned process and release resources allocated for the assigned process when the third-party application exits.

14. The apparatus according to claim 13, wherein, when the processor is configured to cause the apparatus to capture the handle event generated by the handle device connected to the apparatus, the processor is configured to cause the apparatus to:
monitor an event transmitted by an operating system service layer to an operating system application framework layer, and capture the event in a case that the monitored event is a handle event, wherein the handle event is detected by an operating system bottom layer and forwarded to the operating system service layer.

15. The apparatus according to claim 14, wherein, when the processor is configured to cause the apparatus to monitor the event transmitted by the operating system service layer to the operating system application framework layer, the processor is configured to further cause the apparatus to:
call an agent process used for implementing interaction between the third-party application and the shield environment; and
reflect, in the agent process, a first function object in an operating system that is related to the handle event, to generate a second function object that can be called by the shield environment.

16. The apparatus according to claim 15, wherein, when the processor is configured to cause the apparatus to monitor the event transmitted by the operating system service layer to the operating system application framework layer and capturing the event, the processor is configured to cause the apparatus to:
call the second function object, monitor, through the second function object, the handle event transmitted by the operating system service layer to the operating system application framework layer, and capture the handle event in a case that the handle event is detected.

17. The apparatus according to claim 15, wherein, when the processor is configured to cause the apparatus to transmit the first touch event to the third-party application for execution, the processor is configured to cause the apparatus to:
inject the first touch event into the third-party application through the second function object, so that the third-party application executes the first touch event.

18. The apparatus according to claim 15, wherein, after the processor is configured to cause the apparatus to call the agent process used for implementing interaction between the third-party application and the shield environment, the processor is configured to further cause the apparatus to:
create an entry to the third-party application in the agent process, and initialize the entry to the third-party application; and
create an agent activity page belonging to the third-party application through access provided by the entry to the third-party application.

19. A non-transitory storage medium storing computer readable instructions for adapting a handle device to a third-party application, the computer readable instructions, when executed by a processor, causing the processor to:
assign a process to the third-party application, and starting the third-party application through the assigned process;
identify the third-party application currently run by the processor and an activity page currently displayed by the third-party application;
capture a handle event generated by the handle device connected to the processor;
analyze the handle event to obtain an analyzing result, and converting the analyzing result to a first touch event used for controlling the activity page;
transmit the first touch event to the third-party application for execution, so that the third-party application controls the activity page; and
recycle the assigned process and release resources allocated for the assigned process when the third-party application exits.

* * * * *